(12) United States Patent
Ye

(10) Patent No.: US 10,698,551 B2
(45) Date of Patent: Jun. 30, 2020

(54) TOUCH CONTROL DISPLAY PANEL

(71) Applicant: Wuhan China Star Optoelectronics Semiconductor Display Technology Co., Ltd., Wuhan (CN)

(72) Inventor: Jian Ye, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/331,990

(22) PCT Filed: Aug. 8, 2018

(86) PCT No.: PCT/CN2018/099429
§ 371 (c)(1),
(2) Date: Mar. 11, 2019

(87) PCT Pub. No.: WO2020/024315
PCT Pub. Date: Feb. 6, 2020

(65) Prior Publication Data
US 2020/0142536 A1 May 7, 2020

(30) Foreign Application Priority Data
Aug. 1, 2018 (CN) .......................... 2018 1 0865032

(51) Int. Cl.
*G06F 3/045* (2006.01)
*G06F 3/044* (2006.01)

(52) U.S. Cl.
CPC .. *G06F 3/0443* (2019.05); *G06F 2203/04111* (2013.01); *G06F 2203/04112* (2013.01)

(58) Field of Classification Search
CPC . G06F 2203/04103; G06F 2203/04111; G06F 3/0412; G06F 3/0416; G06F 3/044; H01L 27/323
See application file for complete search history.

(56) References Cited

U.S. PATENT DOCUMENTS

2017/0090664 A1* 3/2017 Zheng ..................... G06F 3/044
2017/0115818 A1* 4/2017 Cai ......................... G06F 3/044
2018/0190723 A1 7/2018 Han et al.

FOREIGN PATENT DOCUMENTS

| CN | 108054193 | 5/2015 |
| CN | 108255362 | 7/2018 |
| CN | 108281460 | 7/2018 |

* cited by examiner

*Primary Examiner* — Insa Sadio

(57) ABSTRACT

The present invention provides a touch control display panel, including a display panel, a film packaging layer, and a touch induction layer. The touch induction layer includes multiple first touch control electrode structures, multiple second touch control electrode structures, multiple independent electrode structures and multiple conductive bridges. Grid metal lines of the first touch control electrode structures, the second touch control electrode structures and the independent electrode structures are opposite to gaps between sub-pixels. Adjacent two of the first touch control electrode structures are electrically connected by at least two conductive bridges and at least one independent electrode structure.

20 Claims, 2 Drawing Sheets

TOUCH CONTROL DISPLAY PANEL

RELATED APPLICATIONS

This application is a National Phase of PCT Patent Application No. PCT/CN2018/099429 having International filing date of Aug. 8, 2018, which claims the benefit of priority of Chinese Patent Application No. 201810865032.6 filed on Aug. 1, 2018. The contents of the above applications are all incorporated by reference as if fully set forth herein in their entirety.

FIELD AND BACKGROUND OF THE INVENTION

The present invention relates to a liquid crystal display technology field, and more particularly to a touch control display panel.

An OLED display is a display screen made of organic light-emitting diodes. The OLED display is considered to be a new application technology for the next generation of flat-panel display, because it has excellent characteristics, such as self luminescent light emitting diodes, no backlight, high contrast, thin thickness, wide viewing angle, fast reaction speed, flexible panel, wide range of temperature, simple structure and simple process. Now, a touch induction structure on the OLED display can be roughly divided into two types: In-cell and On-cell.

At present, in Samsung's flexible AMOLED On-cell touch control display, its metal grid touch control electrode adopts an SITO bridge structure. A driving electrode TX and an induction electrode RX are on the same layer. It is electrically insulated at the cross position of the driving electrode TX and the induction electrode RX. The driving electrodes TX located on both sides of the induction electrode RX are connected by a metal bridge on the other layer, and the sub-units (such as TX1/TX2 . . . TXn) of the separated driving electrodes TX are connected by metal bridges, which avoid the R/G/B luminous pixels of the AMOLED display below to avoid shading by the metal bridges and affecting the display quality.

However, the above design has the problems of small capacitance change, insensitive touch, and poor stability of electrical connection.

Hence, the existing technology is defective, and it is urgent to improve it.

SUMMARY OF THE INVENTION

One object of the present invention is to provide a touch control display panel, which has high touch sensitivity.

The present invention provides a touch control display, comprising: a display panel having multiple sub-pixels spaced in an array; a film packaging layer being disposed on the display panel; and a touch induction layer being disposed on the film packaging layer and including multiple grid-like first touch control electrode structures, multiple grid-like second touch control electrode structures, multiple grid-like independent electrode structures, and multiple conductive bridges. Grid metal lines of the first touch control electrode structures, the second touch control electrode structures and the independent electrode structures are opposite to gaps between the sub-pixels. Adjacent two of the first touch control electrode structures are electrically connected by at least two of the conductive bridges and at least one of the independent electrode structures. Wherein each of the conductive bridges is opposite to the gaps between the sub-pixels; and the first touch control electrode structures and the second touch control electrode structures are arranged in a cross rectangular array.

In the touch control display panel of the present invention, each of the first and second touch control electrode structures is provided with multiple first large meshes; the independent electrode structures include multiple first independent electrode structures, which are correspondingly disposed in the first large meshes.

In the touch control display panel of the present invention, the independent electrode structures further includes multiple second independent electrode structures, which are arranged in gaps between the first and second touch control electrode structures adjacent to each other.

In the touch control display panel of the present invention, the first large meshes located in the same first touch control electrode structure or the same second touch control electrode structure are arranged in a rectangular array.

In the touch control display panel of the present invention, adjacent two of the second touch control electrode structures are electrically connected by a grid-like conductive structure.

In the touch control display panel of the present invention, the conductive structure is provided with at least one second large mesh; the independent electrode structures further includes multiple third independent electrode structures, each of which is correspondingly disposed in the second large mesh.

In the touch control display panel of the present invention, the adjacent two of the first touch control electrode structures are electrically connected by at least two of the conductive bridges and at least one of the third independent electrode structures.

In the touch control display panel of the present invention, the adjacent two of the first touch control electrode structures are electrically connected by at least two of the conductive bridges and at least one of the first independent electrode structures; and the at least one of the first independent electrode structures is disposed in the corresponding first large mesh of one second touch control electrode structure, which is close to the adjacent two of the first touch control electrode structures.

In the touch control display panel of the present invention, the adjacent two of the first touch control electrode structures are electrically connected by at least two conductive paths, each of which includes the at least two of the conductive bridges and the at least one of the independent electrode structures.

The present invention further provides a touch control display, comprising: a display panel, having multiple sub-pixels spaced in an array; a film packaging layer, being disposed on the display panel; and a touch induction layer, being disposed on the film packaging layer and including multiple grid-like first touch control electrode structures, multiple grid-like second touch control electrode structures, multiple grid-like independent electrode structures and multiple conductive bridges. Grid metal lines of the first touch control electrode structures, the second touch control electrode structures and the independent electrode structures are opposite to gaps between the sub-pixels. Adjacent two of the first touch control electrode structures are electrically connected by at least two of the conductive bridges and at least one of the independent electrode structures.

In the touch control display panel of the present invention, each of the conductive bridges is opposite to the gaps between the sub-pixels.

In the touch control display panel of the present invention, the first touch control electrode structures and the second touch control electrode structures are arranged in a cross rectangular array.

In the touch control display panel of the present invention, each of the first and second touch control electrode structures is provided with multiple first large meshes; the independent electrode structures include multiple first independent electrode structures, which are correspondingly disposed in the first large meshes.

In the touch control display panel of the present invention, the independent electrode structures further includes multiple second independent electrode structures, which are arranged in gaps between the first and second touch control electrode structures adjacent to each other.

In the touch control display panel of the present invention, the first large meshes located in the same first touch control electrode structure or the same second touch control electrode structure are arranged in a rectangular array.

In the touch control display panel of the present invention, adjacent two of the second touch control electrode structures are electrically connected by a grid-like conductive structure.

In the touch control display panel of the present invention, the conductive structure is provided with at least one second large mesh; the independent electrode structures further includes multiple third independent electrode structures, each of which is correspondingly disposed in the second large mesh.

In the touch control display panel of the present invention, the adjacent two of the first touch control electrode structures are electrically connected by at least two of the conductive bridges and at least one of the third independent electrode structures.

In the touch control display panel of the present invention, the adjacent two of the first touch control electrode structures are electrically connected by at least two of the conductive bridges and at least one of the first independent electrode structures; and the at least one of the first independent electrode structures is disposed in the corresponding first large mesh of one second touch control electrode structure, which is close to the adjacent two of the first touch control electrode structures.

In the touch control display panel of the present invention, the adjacent two of the first touch control electrode structures are electrically connected by at least two conductive paths, each of which includes the at least two of the conductive bridges and the at least one of the independent electrode structures.

The touch control display panel of the present invention employs the conductive bridge and the independent electrode structure in the same layer to electrically connect the adjacent two of the first touch control electrode structures, thereby obtaining high touch sensitivity.

BRIEF DESCRIPTION OF THE SEVERAL VIEWS OF THE DRAWINGS

For more clearly understanding above content of the present invention, the following text will briefly introduce the accompanying drawings used in the preferred embodiment of the present invention. It is obvious that the accompanying drawings in the following description are only some embodiments of the present invention. For the technical personnel of the field, other drawings can also be obtained from these drawings without paying creative work.

DESCRIPTION OF SPECIFIC EMBODIMENTS OF THE INVENTION

Figure 1:
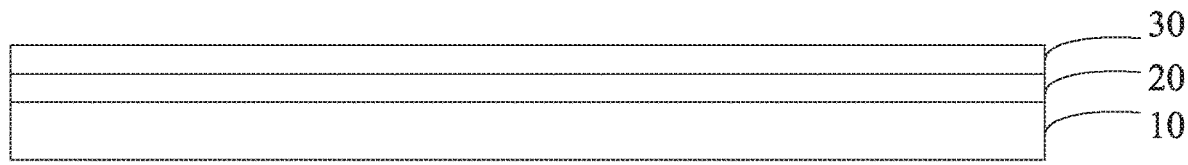
FIG. 1 is a structure schematic view of a touch control display panel of the present invention.

The following text will describe embodiments of the present invention in detailed. The embodiments are shown in the accompanying drawings, in which the same or similar signs represent the same or similar elements or elements with the same or similar functions from beginning to end. The following embodiments described with reference to the accompanying drawings are illustrative and are intended only to explain the present invention and are not understood as limitations to the invention.

In the following description of the present invention, it should be noted that terminology, such as "center", "longitudinal", "lateral", "length", "width", "thickness", "upper", "lower", "front", "back", "left", "right", "vertical", "horizontal", "top", "bottom", "inside", "outside", "clockwise", "counterclockwise" etc., are used with reference to the orientation or position of the accompanying drawings. They are intended to better and more clearly describe and understand the present invention, but not intended to instruct or imply that the referred device or element has to be of a certain direction, or operated or constructed along a certain direction. Therefore, these terms cannot be interpreted as limitations to the present invention. Moreover, the terms, such as "first" and "second", and the like, are only used to distinguish one entity or operation from another entity or operation, but not understood to instruct or imply the relative importance or implicitly indicate the number of technical characteristics indicated. Further, the features defined by "first" and "second" may explicitly or implicitly include one or more the sorts of features. In the description of the present invention, unless otherwise specified, "multiple" mean two or more.

In the following description of the present invention, it need be noted that, unless expressly described otherwise, terms, such as "mount", "connect", "connection", should be understood in a broad sense. For example, these terms may refer to a fixed connection, a detachable connection, or an integrated connection; further they can be a mechanical connection, an electrical connection or a mutual communication; and they can be a direct connection or an indirect connection through an intermediate medium, and can be an interconnection or interaction relationship between the two components. For those of ordinary skill in the art, the specific meaning of the above-mentioned terms in the present invention can be understood according to specific circumstances.

In the present invention, unless expressly described otherwise, the meaning of a first feature located on a second feature or under the second feature can refer to a direct contact between the first and second features, or can refer to an indirect contact between the first and second features by other features. Moreover, the meaning of "above" includes "over" and "in the . . . inclined top", or only represents that the level of the first feature is higher than the second feature. Further, the meaning of "below" includes "under" and "in the . . . oblique below", or only represents that the level of the first feature is lower than the second feature.

The following disclosure provides many different embodiments or examples to implement different structures of the present invention. In order to simplify the description, only parts and settings in the specific examples are described in the following sections. Of course, they are only examples, and are not used to limit the invention. In addition, reference numbers and/or reference letters can be repeatedly used in different examples of the present invention for the purpose of simplification and clarity, and they do not represent the relationship of the various embodiments and/or elements discussed. In addition, the present invention provides examples of various specific processes and materials, but those of ordinary skill in the art can be aware of the application of other processes and/or the use of other materials.

Please refer to FIG. 1, which is a structure schematic view of a touch control display panel of the present invention. The touch control display panel includes a display panel 10, a film packaging layer 20 and a touch induction layer 30. The film packaging layer 20 is disposed on the display panel 10. The touch induction layer 30 is disposed on the film packaging layer 20.

The display panel 10 is an OLED display, which includes a substrate, a TFT device layer, a source-drain electrode layer, an anode metal layer, a light-emitting layer, a cathode metal layer, etc. on the substrate. The light-emitting layer has multiple sub-pixels spaced in an array. Three sub-pixels form one pixel. Specifically, the sub-pixels include multiple red sub-pixels, multiple green sub-pixels and multiple blue sub-pixels. One red sub-pixel, one green sub-pixel and one blue sub-pixel can form one pixel. Of course, it is not limited to this.

The film packaging layer 20 is similar to an existing packaging layer, so it does not go into details.

Figure 2:
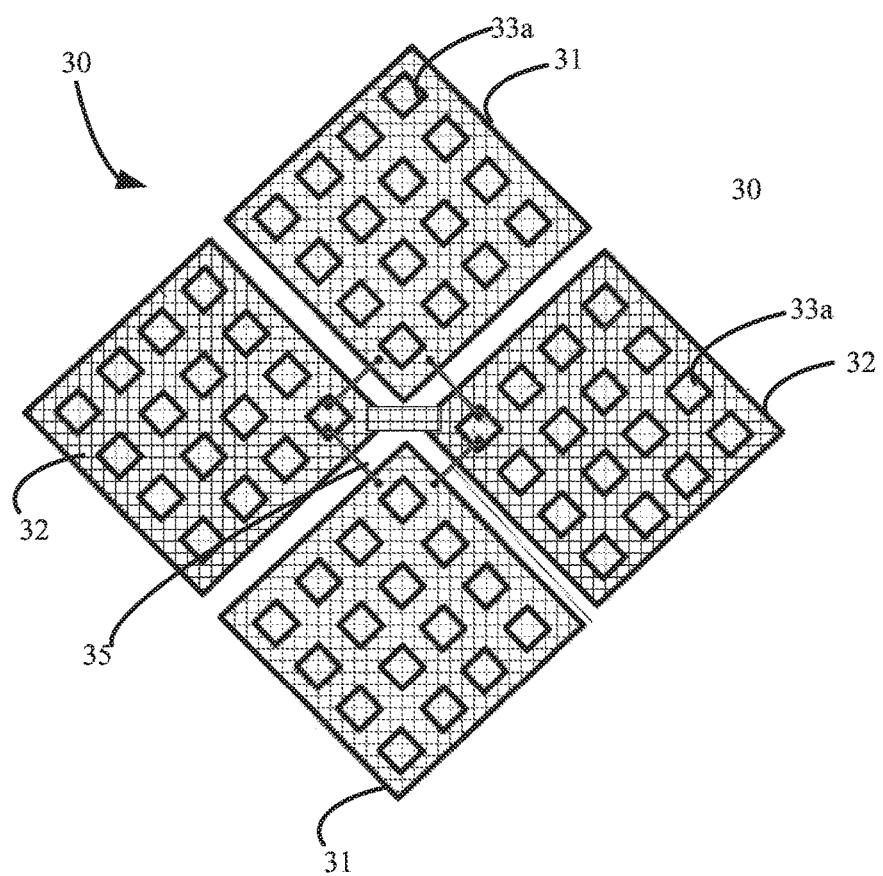
FIG. 2 is a structure schematic view of a first structure of a touch induction layer in the touch control display panel of the present invention.

Please refer to FIG. 2, which is a structure schematic view of a first structure of the touch induction layer 30. The touch induction layer 30 includes multiple grid-like first touch control electrode structures 31, multiple grid-like second touch control electrode structures 32, multiple grid-like independent electrode structures 33, multiple conductive bridges 35 and a grid-like conductive structure 34 (label seen in FIGS. 3 and 4). Of course, it is not limited to this. The first touch control electrode structure 31 is an emitter electrode, and the second touch control electrode structure 32 is a receiving electrode. Of course, it can be understood that, the first touch control electrode structure 31 may be the receiving electrode, and the second touch control electrode structure 32 may be the emitter electrode.

All of the first touch control electrode structures 31, the second touch control electrode structures 32 and the independent electrode structures 33 are made up of grid metal lines. The grid metal lines are opposite to gaps between the sub-pixels, and each of the conductive bridges 35 is also opposite to the gaps between the sub-pixels, in order to avoid shading by the grid metal lines and the metal bridges and affecting the display quality.

The grid metal lines of each of the first touch control electrode structures 31 are distributed in a rectangular region. The grid metal lines of each of the second touch control electrode structures 32 are also distributed in a rectangular region. In the drawings of the present invention, a rough line is a boundary line of the rectangular region. But the boundary line of the region is not necessarily a neat straight line, and it may be a curve line or a concave and convex line. The grid metal lines are disconnected between the adjacent regions, and the boundary line of the region may or may not have metal lines. A fine solid line indicates that the metal lines in the region are grid-like, and are not necessarily made up of transverse metal lines and longitudinal metal lines.

The first touch control electrode structures 31 and the second touch control electrode structures 32 are arranged in a cross rectangular array. Adjacent two of the first touch control electrode structures 31 are electrically connected by at least two conductive bridges 35 and at least one independent electrode structure 33. Adjacent two of the second touch control electrode structures 32 are electrically connected by the grid-like conductive structure 34. The conductive structure 34 is made up of grid metal lines.

Each of the first and second touch control electrode structures 31, 32 is provided with multiple first large meshes. The independent electrode structures 33 include multiple first independent electrode structures 33a, which are correspondingly disposed in the first large meshes. The first large meshes located in the same first touch control electrode structure 31 or the same second touch control electrode structure 32 are arranged in a rectangular array. Of course, on the whole, the first large meshes are also distributed in a rectangular array.

The first large mesh is rectangular, but it can also be of other shapes. Each first independent electrode structure 33a is spaced at a certain distance from the edge of the corresponding first large mesh to avoid short circuit.

In the embodiment, the adjacent two of the first touch control electrode structures 31 are electrically connected by at least two conductive bridges 35 and at least one first independent electrode structure 33a. Preferably, the adjacent two of the first touch control electrode structures 31 can be electrically connected by four conductive bridges 35 and two first independent electrode structures 33a. The four conductive bridges 35 and the two first independent electrode structures 33a form two conductive paths, each of which can connect the adjacent two of the first touch control electrode structures 31 electrically. The two first independent electrode structures 33a are respectively distributed in the first large meshes of two of the second touch control electrode structures 32. Both of the two second touch control electrode structures 32 are close to the adjacent two of the first touch control electrode structures 31. One of the first independent electrode structures 33a is electrically connected to the adjacent two of the first touch control electrode structures 31 by two conductive bridges 35, and the other of the first independent electrode structures 33a is also electrically connected to the adjacent two of the first touch control electrode structures 31 by two conductive bridges 35.

Figure 3:
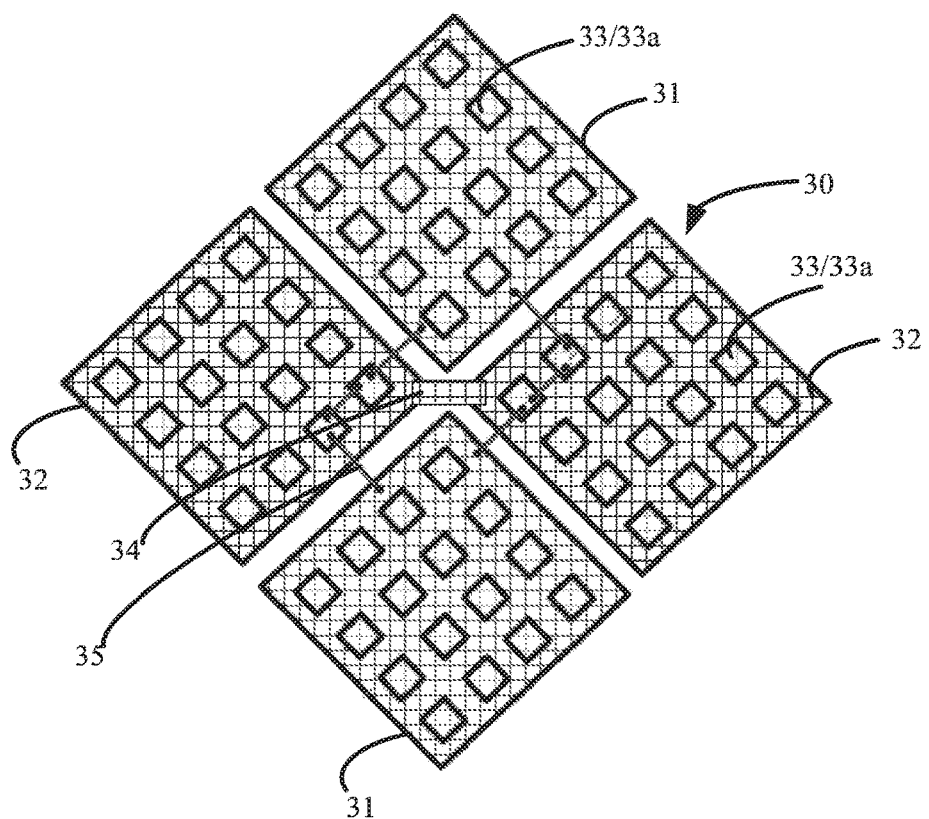
FIG. 3 is a structure schematic view of a second structure of the touch induction layer in the touch control display panel of the present invention.

Please refer to FIG. 3, which is a structure schematic view of a second structure of the touch induction layer 30. In the embodiment, the adjacent two of the first touch control electrode structures 31 are electrically connected by at least three conductive bridges 35 and at least two first independent electrode structure 33a. Preferably, the adjacent two of the first touch control electrode structures 31 are electrically connected by six conductive bridges 35 and four first independent electrode structure 33a. The six conductive bridges 35 and the four first independent electrode structures 33a form two conductive paths to connect the adjacent two of the first touch control electrode structures 31. Each conductive path includes three conductive bridges 35 and two first independent electrode structures 33a. The two first independent electrode structures 33a in the same conductive path are disposed in the first large meshes of the same second touch control electrode structure 32. The conducting order of each conductive path is: one first touch control electrode structure 31, one of conductive bridges 35, one of the two first independent electrode structures 33a, another one of the conductive bridges 35, the other of the two first independent electrode structures 33a, one after another of the conductive bridges 35, and the other first touch control electrode structure 31.

Figure 4:
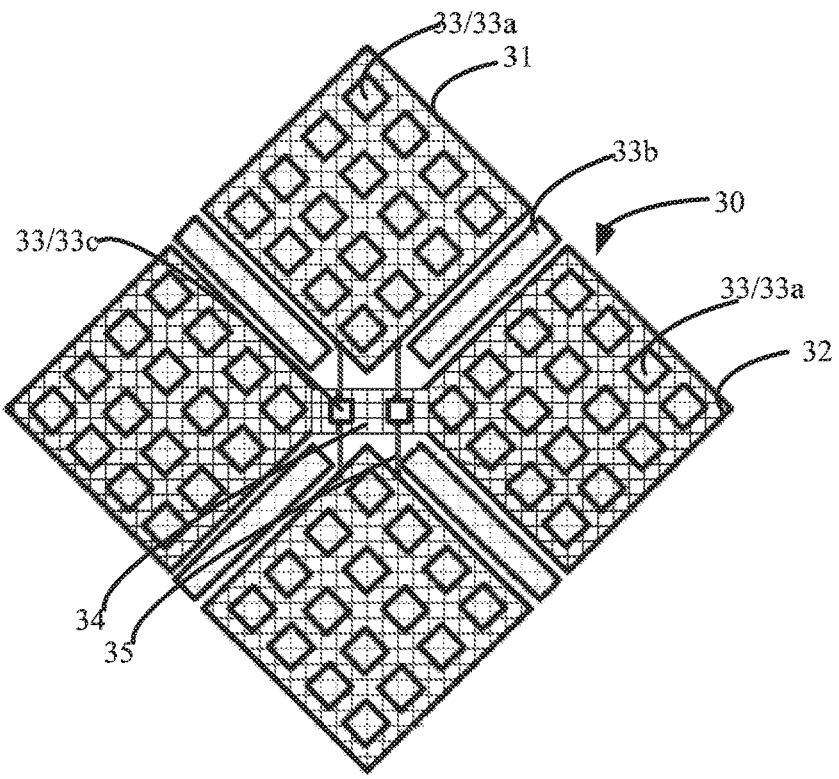
FIG. 4 is a structure schematic view of a third structure of the touch induction layer in the touch control display panel of the present invention.

Please refer to FIG. 4, which is a structure schematic view of a third structure of the touch induction layer 30. In the embodiment, the independent electrode structures 33 includes multiple first independent electrode structures 33a, multiple second independent electrode structures 33b and multiple third independent electrode structures 33c. The second independent electrode structures 33b are arranged in gaps between the first and second touch control electrode structures 31, 32 adjacent to each other. The first independent electrode structures 33a are correspondingly disposed in the first large meshes. The conductive structure 34 is provided with at least one second large mesh. The third independent electrode structure 33c is correspondingly disposed in the second large mesh.

The second large mesh is rectangular, but it can also be of other shapes. Each third independent electrode structure 33c is spaced at a certain distance from the edge of the corresponding second large mesh to avoid short circuit.

In the embodiment, the adjacent two of the first touch control electrode structures 31 are electrically connected by at least two conductive bridges 35 and at least one third independent electrode structure 33c. Preferably, the adjacent two of the first touch control electrode structures 31 are electrically connected by four conductive bridges 35 and two third independent electrode structures 33c. The four conductive bridges 35 and the two third independent electrode structures 33c form two conductive paths to connect the adjacent two of the first touch control electrode structures 31. Each conductive path includes two conductive bridges 35 and one third independent electrode structures 33c.

The touch control display panel of the present invention employs the conductive bridge and the independent electrode structure in the same layer to electrically connect the adjacent two of the first touch control electrode structures, thereby obtaining high touch sensitivity.

The above description of the touch control display panel provided by the embodiments of the present invention is described in detail. In above text, the principles and implementation mode of the present invention are expounded with specific examples, and above specific examples are only for helping to understand the invention. Moreover, for those of ordinary skill in the art, there will be changes in the specific implementation and application scope according to the ideas of the present invention. In summary, the content of this specification should not be understood as a limitation to the present invention.

What is claimed is:

1. A touch control display panel, which comprises:
    a display panel, having multiple sub-pixels spaced in an array;
    a film packaging layer, being disposed on the display panel; and
    a touch induction layer, being disposed on the film packaging layer and including multiple grid-like first touch control electrode structures, multiple grid-like second touch control electrode structures, multiple grid-like independent electrode structures and multiple conductive bridges; grid metal lines of the first touch control electrode structures, the second touch control electrode structures and the independent electrode structures being opposite to gaps between the sub-pixels; adjacent two of the first touch control electrode structures being electrically connected by at least two of the conductive bridges and at least one of the independent electrode structures;
    wherein each of the conductive bridges is opposite to the gaps between the sub-pixels; and the first touch control electrode structures and the second touch control electrode structures are arranged in a cross rectangular array.

2. The touch control display panel as claimed in claim 1, wherein each of the first and second touch control electrode structures is provided with multiple first large meshes; the independent electrode structures include multiple first independent electrode structures, which are correspondingly disposed in the first large meshes.

3. The touch control display panel as claimed in claim 2, wherein the independent electrode structures further includes multiple second independent electrode structures, which are arranged in gaps between the first and second touch control electrode structures adjacent to each other.

4. The touch control display panel as claimed in claim 2, wherein the first large meshes located in the same first touch control electrode structure or the same second touch control electrode structure are arranged in a rectangular array.

5. The touch control display panel as claimed in claim 3, wherein adjacent two of the second touch control electrode structures are electrically connected by a grid-like conductive structure.

6. The touch control display panel as claimed in claim 5, wherein the conductive structure is provided with at least one second large mesh; the independent electrode structures further includes multiple third independent electrode structures, each of which is correspondingly disposed in the second large mesh.

7. The touch control display panel as claimed in claim 6, wherein the adjacent two of the first touch control electrode structures are electrically connected by at least two of the conductive bridges and at least one of the third independent electrode structures.

8. The touch control display panel as claimed in claim 2, wherein the adjacent two of the first touch control electrode structures are electrically connected by at least two of the conductive bridges and at least one of the first independent electrode structures; and the at least one of the first independent electrode structures is disposed in the corresponding first large mesh of one second touch control electrode structure, which is close to the adjacent two of the first touch control electrode structures.

9. The touch control display panel as claimed in claim 1, wherein the adjacent two of the first touch control electrode structures are electrically connected by at least two conductive paths, each of which includes the at least two of the conductive bridges and the at least one of the independent electrode structures.

10. A touch control display panel, which comprises:
    a display panel, having multiple sub-pixels spaced in an array;
    a film packaging layer, being disposed on the display panel; and
    a touch induction layer, being disposed on the film packaging layer and including multiple grid-like first touch control electrode structures, multiple grid-like second touch control electrode structures, multiple grid-like independent electrode structures and multiple conductive bridges; grid metal lines of the first touch control electrode structures, the second touch control electrode structures and the independent electrode structures being opposite to gaps between the sub-pixels; adjacent two of the first touch control electrode structures being electrically connected by at least two of the conductive bridges and at least one of the independent electrode structures.

11. The touch control display panel as claimed in claim 10, wherein each of the conductive bridges is opposite to the gaps between the sub-pixels.

12. The touch control display panel as claimed in claim 10, wherein the first touch control electrode structures and the second touch control electrode structures are arranged in a cross rectangular array.

13. The touch control display panel as claimed in claim 12, wherein each of the first and second touch control electrode structures is provided with multiple first large meshes; the independent electrode structures include multiple first independent electrode structures, which are correspondingly disposed in the first large meshes.

14. The touch control display panel as claimed in claim 13, wherein the independent electrode structures further includes multiple second independent electrode structures, which are arranged in gaps between the first and second touch control electrode structures adjacent to each other.

15. The touch control display panel as claimed in claim 13, wherein the first large meshes located in the same first touch control electrode structure or the same second touch control electrode structure are arranged in a rectangular array.

16. The touch control display panel as claimed in claim 14, wherein adjacent two of the second touch control electrode structures are electrically connected by a grid-like conductive structure.

17. The touch control display panel as claimed in claim 16, wherein the conductive structure is provided with at least one second large mesh; the independent electrode structures further includes multiple third independent electrode structures, each of which is correspondingly disposed in the second large mesh.

18. The touch control display panel as claimed in claim 17, wherein the adjacent two of the first touch control electrode structures are electrically connected by at least two of the conductive bridges and at least one of the third independent electrode structures.

19. The touch control display panel as claimed in claim 13, wherein the adjacent two of the first touch control electrode structures are electrically connected by at least two of the conductive bridges and at least one of the first independent electrode structures; and the at least one of the first independent electrode structures is disposed in the corresponding first large mesh of one second touch control electrode structure, which is close to the adjacent two of the first touch control electrode structures.

20. The touch control display panel as claimed in claim 10, wherein the adjacent two of the first touch control electrode structures are electrically connected by at least two conductive paths, each of which includes the at least two of the conductive bridges and the at least one of the independent electrode structures.

* * * * *